Dec. 29, 1959 G. ROSENBERGER ET AL 2,919,312

MAGNETIC HEADS

Filed March 16, 1954

Inventors
Georg Rosenberger
and Helmut Neumann
By [signature] att'y.

United States Patent Office 2,919,312

Patented Dec. 29, 1959

2,919,312

MAGNETIC HEADS

Georg Rosenberger, Munich, and Helmut Neumann, Karlsruhe, Germany, assignors to Siemens & Halske Aktiengesellschaft, Munich, Germany, a corporation of Germany Application March 16, 1954, Serial No. 416,673

Claims priority, application Germany March 20, 1953

3 Claims. (Cl. 179—100.2)

This invention is concerned with a magnetic head comprising a core of sintered ferromagnetic material of ceramic nature, for example ferrite, having a relatively narrow gap, especially for longitudinal magnetization and for coaction at one side thereof with a magnetic carrier such as a tape or the like. The magnetic head may be a record head or a pickup head or an erase head.

Magnetic heads comprising cores made of sintered metal or metallic alloys, for example, ferrite, instead of being made of laminated sheet material, present due to their relatively low electric conductivity and good magnetic properties considerable advantages at higher frequencies. As further advantages of such structures may be mentioned considerably greater resistance of the pole pieces formed by the cores, against wear, due to the greater hardness of the material, and decreased residual magnetism. Magnetic heads of this type also exhibit advantages so far as magnetic and mechanical properties are concerned. Erase heads having cores made of such ferromagnetic material provide lower eddy current losses than laminated cores. Prior erase heads with laminated cores assumed relatively high temperatures when operated with frequencies from about 60–100 kilocycles and relatively high current. Such heating can be reduced by using the new cores.

The drawbacks arising in the fabrication of the cores reside in difficulties due to the brittleness of the sintered oxide-ceramic material, especially when it is desired to form narrow gaps of a width on the order of about 10 microns, for pickup and record heads, or gaps of a width of about 0.2 millimeter for erase heads. An exact formation of the gap by grinding, sawing, milling and the like was found impossible because the hard ceramic core material cracks, causing chipping off of parts at the edges of the gap to be formed. It was for these reasons impossible to produce gap surfaces having sharp and well defined edges. The effective gaps were accordingly badly defined and the gap width became generally wider than is permissible for the recording of the highest audio frequencies.

It was until now, for the foregoing reason impossible to fully utilize the favorable electrical, mechanical and magnetic advantages of the sintered materials, and magnetic heads comprising such materials were accordingly practically no better than heads comprising laminated cores.

The magnetic heads according to the invention are made by production and machining steps which result in satisfactory gaps as well as other desirable electrical, magnetic and mechanical properties.

In accordance with one object, the invention proposes to produce a suitably shaped, for example, ring-shaped or an oval-shaped or a U-shaped core forming two limbs which are cross-sectionally circular for receiving coil means, by cutting or sawing a unitary sintered member to form two halves, or by molding or pressing each half individually; thereafter grinding and interiorly shaping, that is, pointing, rounding or angularly shaping the surfaces of the two halves which are to define pole pieces to form the gap; thereupon placing the coils upon the two core halves; and thereafter assembling the two halves and securing them together with the pole pieces properly aligned to form the gap.

In accordance with another object and feature, the invention proposes to produce a core of the ferromagnetic material noted before, such core forming the gap, and to dispose between the pole pieces, that is, within the gap, a thin foil-like or platelike filler material of substantially similar hardness as the core, for example, in the case of record or pickup heads, material such as molybdenum or tungsten, quartz or glass, or electrically and magnetically substantially nonconductive ceramic material such as porcelain or the like. Material having low electric and magnetic conductivity, such as quartz, glass or porcelain is especially favorable as a filler for the gaps of erase heads. The outer surfaces of the pole pieces are thereupon ground at least at the region which is to coact with or be contacted by the magnetic carrier or tape. This final grinding of the core in the vicinity of the gap which contains the filler material of approximately the same hardness as the pole piece material makes it possible to produce a satisfactory gap because the effective gap-defining edges are supported by the filler, chipping off of the material as it always occurs if it is attempted to grind the gap edges to the desired shape prior to the joining of the pole pieces being in this manner prevented.

The magnetic head produced in this manner and comprising the sintered core has a wholly satisfactorily limited and well defined very narrow working gap facing the the magnetic carrier.

The invention will now be described with reference to the accompanying diagrammatic drawings wherein Fig. 1 shows an example of an oval-shaped sintered ferromagnetic core body in elevational side view;

Figure 1:
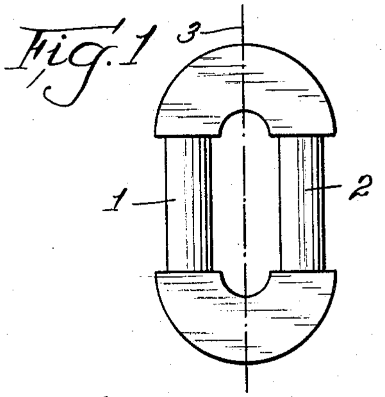

Referring now to the drawings, Fig. 1 indicates an elevational diagrammatic side view of an example of an oval-shaped sintered ferromagnetic core as it may be used for producing a magnetic pickup or record head according to the invention. Ring-shaped or equivalently shaped cores may of course be used to equal advantage. The core is not exactly of ellipsoid shape but is provided with straight parallel limbs 1 and 2, which may be cross-sectionally circular, for receiving the required coils.

Figure 2:
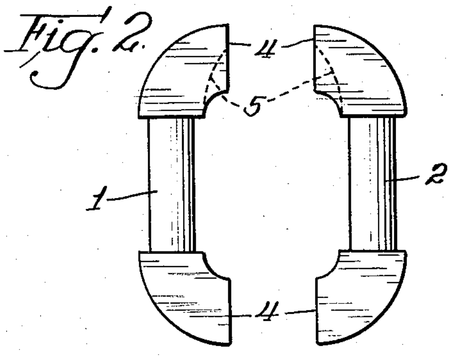
Fig. 2 illustrates two halves of the core to be made; each half may be individually formed or obtained by cutting the body of Fig. 1.

The core is in suitable manner and by suitable means severed along the median dot-dash line 3, for example, by cutting with a saw, to produce the two separate halves shown in Fig. 2.

It is of course not absolutely necessary to start with a core body such as indicated in Fig. 1; each of the two halves shown in Fig. 2 may, for example, be individually formed by suitable moldings or pressing.

The surfaces 4 of the two pole pieces which will define the gap, are thereupon planed by suitable grinding, for example, by rubbing them against very fine emery paper placed upon a support, to make them plane and extending in parallel.

The next step requires, in accordance with the invention, suitable angular machining or forming to provide pointed or inclined or rounded ends extending generally along the lines 5 in Fig. 2.

Figure 3:
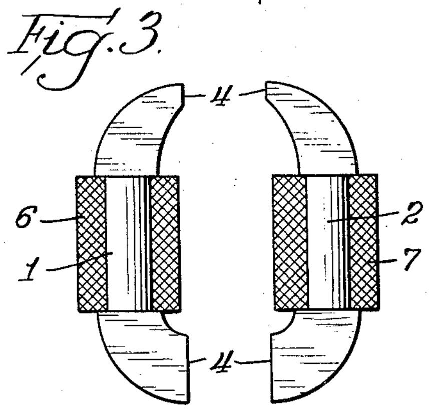
Fig. 3 represents the two halves of the core after shaping and provided with the associated coils.

The coils 6 and 7 are thereupon placed upon the straight limbs 1 and 2, respectively, to form the parts shown in Fig. 3.

The pole pieces of the two halves of Fig. 3 are thereupon suitably assembled to form the final core structure.

Figure 4:
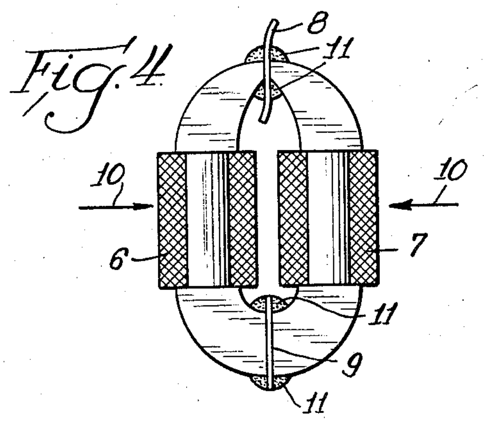
Fig. 4 illustrates the joining or assembling of the two halves of the core by the use of a gap filler material.

As illustrated in Fig. 4, a filler material 8 and 9 may be interposed between the faces of the inwardly facing ends of the core halves. Lateral pressure is suitably applied in the direction of the arrows 10. The inwardly facing ends of the two halves of the core are secured together, for example, by means of a suitable adhesive or cement 11. The upwardly disposed inwardly facing ends of the core halves, as seen in the figures, form the magnetically effective pole pieces having a gap containing the filler 8. The joined lower ends containing the filler 9 absorb shearing stresses.

The gap filler material 8 and 9 is, for record or pickup heads, preferably foil or plate-shaped and approximately 10 microns thick, its width corresponding to the width of the desired gap.

At least the gap filler material 8 is preferably of a hardness corresponding substantially to that of the sintered core and pole pieces, for example, molybdenum or tungsten or quartz or glass or electrically and magnetically nonconductive material such as porcelain or the like. Similar material may be used for the filler 9, but its kind is not as critical because the corresponding gap merely serves for absorbing shearing stresses, having no coaction with the magnetic carrier. The corresponding gap therefore does not have to be of the quality of the other gap which is effective in the recording or the pickup operation, respectively, for which the head may be used.

A self-hardening resinous material known in Germany as Araldítharz G may be used for the adhesive or cement 11.

Figure 5:
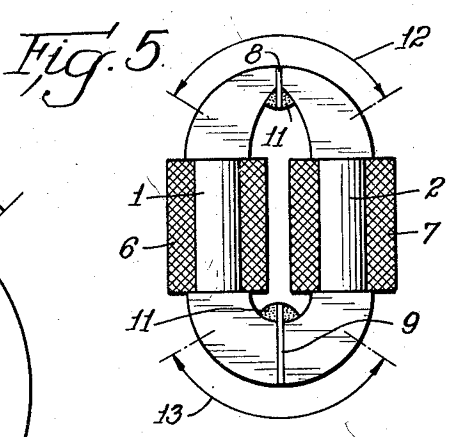
Fig. 5 illustrates the assembled core structure having the surfaces of the gap-forming pole pieces shaped by final grinding.

The cement is permitted to solidify and the resulting structure is then ground along the outer surfaces comprising the gap fillers 8 and 9, at least within the regions indicated in Fig. 5 by the arrows 12 and 13. The grinding region along the arrow 12 corresponds to or forms the surface which is contacted by or coacts with the magnetic carrier, for example, a magnetic tape.

The interposed gap filler or foil 8 and if desired also 9 are from about 10 microns to about 15 microns thick.

Figure 6:
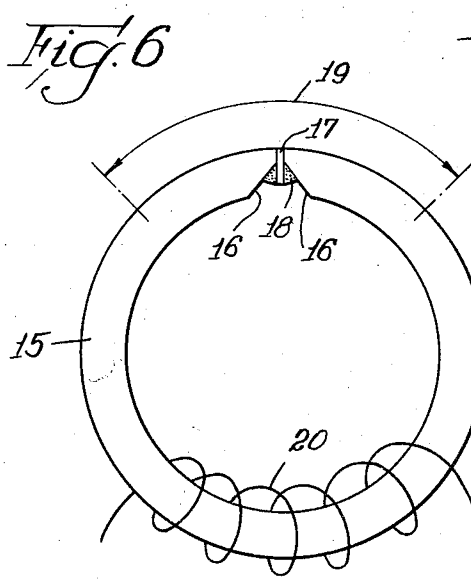
Fig. 6 shows an example of a coil-carrying core for an erase head.

The erase head shown in Fig. 6 comprises a sintered ring-shaped core 15 having pole pieces forming a gap about 0.2 millimeter wide. The gap may be formed by suitable sawing, milling, grinding or the like or may be formed in the pressing or molding operation. The pole pieces are thereupon suitably machined to form the wedge-shaped cutout 16. Such cutout may of course be formed in the molding of the core body.

The gap formed by the pole pieces is in foil or plate form, of material having a relatively low electric conductivity and a hardness corresponding substantially to that of the pole pieces. Glass, quartz or electrically substantially nonconductive material such as porcelain may be used. The filler material 17 projects into the wedge-shaped widened portion 16 and is secured by the adhesive or cement 18, which may be of the previously mentioned self-hardening resinous type. After the cement 18 has set, the surface of the pole pieces, which will coact with the magnetic carrier, tape or the like, is ground as before, for example, along an area indicated by the arrow 19, thus also correspondingly grinding the gap filler 17. Numeral 20 indicates the erase winding which is provided in known manner.

The gap filler is in each embodiment of a hardness which corresponds substantially to that of the corresponding sintered ferromagnetic pole pieces. Accordingly, after the final surface grinding along the areas 12 in Fig. 5 and 19 in Fig. 6, there will in each case result a uniform smooth arcuate continuous surface for magnetic coaction with a magnetic carrier or tape. If the gap filler were softer than the pole pieces, a groove would be formed at the gap; if harder material were used, it would form a ridge. The gap filler specified assures in each case the smooth arcuate active pole and gap surface.

The erase head made in accordance with the invention, provided with the gap filler of relatively low electrical conductivity keeps the eddy current losses at high audio frequencies and with high-frequency current of about 60–100 kilocycles at a minimum.

All operations may be carried out by known means and in known manner.

The respective magnetic core structures produced as described may be embedded in a suitable molding mass contained in a suitably shaped shielding cup.

It may be mentioned in conclusion that certain features of the invention may be practiced independent of certain other features. It is possible, for example, to produce a core for a magnetic record or pickup head by the operations disclosed herein which comprise the steps of forming the core body of two halves, shaping the surfaces at the opposite ends of each half by suitable grinding, thereafter placing the coils on the respective limbs of the two halves, and thereupon assembling the two halves, finally shaped as shown in Fig. 3, to form the desired core structure. A filler may or may not be provided in the magnetically active gap and the filler, if provided, may be of a desired and suitable material. The gap filler material described, having a hardness corresponding substantially to that of the sintered core material, may of course be provided in gaps formed by cores produced in any suitable and desired manner which may be different from the specific manner of producing the cores as disclosed herein.

What is believed to be new and desired to have protected by Letters Patent is defined in the appended claims.

We claim:

1. A magnetic head for coaction with a magnetic carrier comprising a ferrite core having two coil-carrying limbs, arcuate extensions projecting respectively from said limbs integral therewith to form coacting pole pieces separated by a gap, a filler disposed in said gap, said filler being made of a material selected from the class of materials consisting of glass and quartz and molybdenum and ceramic material such as porcelain, the hardness of such filler material corresponding substantially to that of said pole pieces, and cementing means outside of said gap for firmly bonding together said pole pieces with said filler therebetween to form a unitary core structure, the arcuate outer surface formed by said joined pole pieces being ground to form the working face for magnetic coaction with the magnetic carrier, said filler preventing chipping of said pole pieces during said grinding to form sharply defined edges forming the gap containing said filler.

2. The structure defined in claim 1, wherein the width of said gap is on the order of about 10 microns to about 15 microns.

3. The structure as defined in claim 1, wherein said gap is the sole and exclusive gap in said core structure, the width of said gap being on the order of about 0.2 millimeter.

References Cited in the file of this patent

UNITED STATES PATENTS

| | | |
|---|---|---|
| 2,456,767 | Camras | Dec. 21, 1948 |
| 2,585,932 | Hare | Feb. 19, 1952 |
| 2,612,681 | Camras | Oct. 7, 1952 |
| 2,628,286 | Rettinger | Feb. 10, 1953 |
| 2,632,816 | Gratian | Mar. 24, 1953 |
| 2,658,114 | Buhrendorf | Nov. 3, 1953 |
| 2,676,392 | Buhrendorf | Apr. 27, 1954 |
| 2,711,945 | Kornei | June 28, 1955 |
| 2,715,659 | Ibuka et al. | Aug. 16, 1955 |

FOREIGN PATENTS

| | | |
|---|---|---|
| 807,725 | Germany | July 2, 1951 |